(12) United States Patent
Svendsen

(10) Patent No.: US 8,307,092 B2
(45) Date of Patent: Nov. 6, 2012

(54) METHOD AND SYSTEM FOR COLLECTING INFORMATION ABOUT A USER'S MEDIA COLLECTIONS FROM MULTIPLE LOGIN POINTS

(75) Inventor: Hugh Svendsen, Chapel Hill, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 964 days.

(21) Appl. No.: 11/677,106

(22) Filed: Feb. 21, 2007

(65) Prior Publication Data

US 2008/0201446 A1 Aug. 21, 2008

(51) Int. Cl.
*G06F 15/16* (2006.01)

(52) U.S. Cl. ......... 709/227; 709/203; 709/217; 709/223

(58) Field of Classification Search .................... 709/224
See application file for complete search history.

(56) References Cited

U.S. PATENT DOCUMENTS

| | | |
|---|---|---|
| 5,765,028 A | 6/1998 | Gladden |
| 5,787,470 A | 7/1998 | DeSimone et al. |
| 5,864,854 A | 1/1999 | Boyle |
| 5,878,218 A | 3/1999 | Maddalozzo, Jr. et al. |
| 5,884,031 A | 3/1999 | Ice |
| 5,944,780 A | 8/1999 | Chase et al. |
| 5,944,783 A | 8/1999 | Nieten |
| 5,946,464 A | 8/1999 | Kito et al. |
| 6,003,030 A | 12/1999 | Kenner et al. |
| 6,012,083 A | 1/2000 | Savitzky et al. |
| 6,049,821 A | 4/2000 | Theriault et al. |
| 6,081,840 A | 6/2000 | Zhao |
| 6,141,759 A | 10/2000 | Braddy |
| 6,199,107 B1 | 3/2001 | Dujari |
| 6,212,520 B1 | 4/2001 | Maruyama et al. |
| 6,216,151 B1 | 4/2001 | Antoun |
| 6,253,234 B1 | 6/2001 | Hunt et al. |

(Continued)

FOREIGN PATENT DOCUMENTS

EP 1686497 A2 8/2006
(Continued)

OTHER PUBLICATIONS

International Search Report for PCT/US08/54347 mailed Jul. 22, 2008.

(Continued)

*Primary Examiner* — Ian N Moore
*Assistant Examiner* — Jenee Alexander
(74) *Attorney, Agent, or Firm* — Withrow & Terranova, PLLC

(57) ABSTRACT

A system and method for collecting information about a user's media collections at a central location from multiple login points and/or multiple devices owned by the user. The user establishes a user account at a central server. A client application may be downloaded to the user's device for establishing a connection to the central server. Subsequently, each time the user logs in to the central server, the central server receives a unique machine identifier (MID) for the connected and currently in-use user device. The central server receives information about the user's media collection from the user device and stores that media collection by its MID under the user's individual account. In this manner, the central server obtains and stores information about all the user's media collections owned by user devices connected and in-use and previously connected to the central server rather than only having knowledge of the media collection stored on the currently in-use user device.

32 Claims, 11 Drawing Sheets

U.S. PATENT DOCUMENTS

| | | | |
|---|---|---|---|
| 6,330,602 B1 | 12/2001 | Law et al. | |
| 6,336,115 B1 | 1/2002 | Tominaga et al. | |
| 6,374,289 B2 | 4/2002 | Delaney et al. | |
| 6,490,625 B1 | 12/2002 | Islam et al. | |
| 6,507,727 B1 | 1/2003 | Henrick | |
| 6,633,901 B1 | 10/2003 | Zuili | |
| 6,728,729 B1 | 4/2004 | Jawa et al. | |
| 6,807,641 B1 | 10/2004 | Ishiguro et al. | |
| 6,922,843 B1 | 7/2005 | Herrington et al. | |
| 6,941,275 B1 | 9/2005 | Swierczek | |
| 6,985,588 B1 | 1/2006 | Glick et al. | |
| 6,990,453 B2 | 1/2006 | Wang et al. | |
| 7,046,139 B2 | 5/2006 | Kuhn et al. | |
| 7,069,310 B1 | 6/2006 | Bartholomew | |
| 7,194,555 B2 | 3/2007 | Scibora | |
| 7,203,711 B2 | 4/2007 | Borden et al. | |
| 7,277,766 B1 | 10/2007 | Khan et al. | |
| 7,310,629 B1 | 12/2007 | Mendelson et al. | |
| 7,444,388 B1 | 10/2008 | Svendsen | |
| 7,542,992 B1 | 6/2009 | Pandurangan et al. | |
| 7,668,821 B1* | 2/2010 | Donsbach et al. | 705/27 |
| 7,678,984 B1 | 3/2010 | Lamere | |
| 7,680,959 B2 | 3/2010 | Svendsen | |
| 7,765,192 B2 | 7/2010 | Svendsen | |
| 7,860,837 B2 | 12/2010 | Ali et al. | |
| 8,060,477 B1 | 11/2011 | Svendsen | |
| 8,185,579 B2 | 5/2012 | Svendsen | |
| 2001/0051996 A1 | 12/2001 | Cooper et al. | |
| 2002/0025141 A1 | 2/2002 | Matsumoto et al. | |
| 2002/0033844 A1 | 3/2002 | Levy et al. | |
| 2002/0052885 A1 | 5/2002 | Levy | |
| 2002/0065074 A1 | 5/2002 | Cohn et al. | |
| 2002/0100054 A1 | 7/2002 | Feinberg et al. | |
| 2002/0124252 A1 | 9/2002 | Schaefer et al. | |
| 2002/0152318 A1 | 10/2002 | Menon et al. | |
| 2002/0156546 A1 | 10/2002 | Ramaswamy | |
| 2002/0157002 A1 | 10/2002 | Messerges et al. | |
| 2002/0194264 A1 | 12/2002 | Uchiyama et al. | |
| 2003/0023427 A1 | 1/2003 | Cassin et al. | |
| 2003/0045265 A1 | 3/2003 | Huang et al. | |
| 2003/0055657 A1 | 3/2003 | Yoshida et al. | |
| 2003/0206717 A1 | 11/2003 | Yogeshwar et al. | |
| 2003/0233663 A1 | 12/2003 | Rao et al. | |
| 2004/0034441 A1 | 2/2004 | Eaton et al. | |
| 2004/0057348 A1 | 3/2004 | Shteyn et al. | |
| 2004/0064500 A1 | 4/2004 | Kolar et al. | |
| 2004/0088348 A1 | 5/2004 | Yeager et al. | |
| 2004/0096110 A1 | 5/2004 | Yogeshwar et al. | |
| 2004/0117828 A1 | 6/2004 | Parker et al. | |
| 2004/0158865 A1 | 8/2004 | Kubler et al. | |
| 2004/0177115 A1* | 9/2004 | Hollander et al. | 709/203 |
| 2004/0224638 A1 | 11/2004 | Fadell et al. | |
| 2005/0010616 A1 | 1/2005 | Burks | |
| 2005/0015713 A1 | 1/2005 | Plastina et al. | |
| 2005/0021420 A1 | 1/2005 | Michelitsch et al. | |
| 2005/0026559 A1 | 2/2005 | Khedouri | |
| 2005/0108303 A1 | 5/2005 | Carter | |
| 2005/0119977 A1 | 6/2005 | Raciborski | |
| 2005/0154764 A1 | 7/2005 | Riegler et al. | |
| 2005/0155052 A1 | 7/2005 | Ostrowska et al. | |
| 2005/0216855 A1 | 9/2005 | Kopra et al. | |
| 2005/0251566 A1* | 11/2005 | Weel | 709/219 |
| 2005/0251576 A1* | 11/2005 | Weel | 709/227 |
| 2005/0273825 A1 | 12/2005 | Eldeeb | |
| 2006/0004640 A1 | 1/2006 | Swierczek | |
| 2006/0008256 A1 | 1/2006 | Khedouri et al. | |
| 2006/0087926 A1 | 4/2006 | Hwang | |
| 2006/0092282 A1 | 5/2006 | Herley et al. | |
| 2006/0130119 A1 | 6/2006 | Candelore et al. | |
| 2006/0143236 A1* | 6/2006 | Wu | 707/104.1 |
| 2006/0159109 A1 | 7/2006 | Lamkin et al. | |
| 2006/0161635 A1 | 7/2006 | Lamkin et al. | |
| 2006/0168351 A1 | 7/2006 | Ng et al. | |
| 2006/0195462 A1 | 8/2006 | Rogers | |
| 2006/0195513 A1* | 8/2006 | Rogers et al. | 709/203 |
| 2006/0195514 A1* | 8/2006 | Rogers et al. | 709/203 |
| 2006/0195515 A1* | 8/2006 | Beaupre et al. | 709/203 |
| 2006/0195521 A1* | 8/2006 | New et al. | 709/204 |
| 2006/0206582 A1 | 9/2006 | Finn | |
| 2006/0221257 A1 | 10/2006 | Nakayama | |
| 2006/0233063 A1* | 10/2006 | Inoue et al. | 369/30.03 |
| 2007/0005990 A1* | 1/2007 | Sathish | 713/189 |
| 2007/0008280 A1 | 1/2007 | Ullmann | |
| 2007/0055754 A1 | 3/2007 | Robbin et al. | |
| 2007/0067794 A1 | 3/2007 | Russell et al. | |
| 2007/0130207 A1 | 6/2007 | Pate et al. | |
| 2007/0159934 A1* | 7/2007 | Weon | 707/1 |
| 2007/0168540 A1 | 7/2007 | Hansson | |
| 2007/0198746 A1 | 8/2007 | Myllyla et al. | |
| 2007/0219856 A1* | 9/2007 | Ahmad-Taylor | 705/14 |
| 2007/0220552 A1* | 9/2007 | Juster et al. | 725/46 |
| 2007/0245398 A1 | 10/2007 | Roden | |
| 2008/0010372 A1 | 1/2008 | Khedouri et al. | |
| 2008/0016205 A1 | 1/2008 | Svendsen | |
| 2008/0086750 A1* | 4/2008 | Yasrebi et al. | 725/86 |
| 2008/0091771 A1* | 4/2008 | Allen et al. | 709/203 |
| 2008/0104111 A1* | 5/2008 | Slaney et al. | 707/104.1 |
| 2008/0147711 A1* | 6/2008 | Spiegelman et al. | 707/102 |
| 2008/0162655 A1* | 7/2008 | Khedouri et al. | 709/206 |
| 2009/0055510 A1 | 2/2009 | Svendsen | |
| 2009/0077084 A1 | 3/2009 | Svendsen | |
| 2011/0225175 A1 | 9/2011 | Asaka et al. | |

FOREIGN PATENT DOCUMENTS

| | | |
|---|---|---|
| GB | 2294132 A | 4/1996 |
| GB | 2372850 A | 9/2002 |
| WO | 00/54462 | 9/2000 |
| WO | 01/02905 A1 | 1/2001 |
| WO | 2004/043064 A1 | 5/2004 |
| WO | 2006/093839 A2 | 9/2006 |

OTHER PUBLICATIONS

"Apple—iTunes—Music Store," http://web.archive.org/web/20050305041722/www.apple.com/itunes/store/, copyright 2005 Apple Computer, Inc., printed Dec. 7, 2008, 3 pages.

Lucas Gonze, "A survey of playlist formats," http://gonze.com/playlists/playlist-format-survey.html, Nov. 17, 2003, printed Dec. 7, 2008, 22 pages.

"Acoustic fingerprint," http://en.wikipedia.org/wiki/Acoustic_fingerprint, printed Jul. 3, 2009, 3 pages.

Tony Bowden, "Understanding Nothing, The Music Database: Prehistory," Jun. 25, 2002, http://nothing.tmtm.com/archives/tag/mdb/page/2, printed Jul. 3, 2009, 6 pages.

Rocco Caputo, "CDDB.pm," http://www.mathematik.uni-ulm.de/help/perl5/doc-5.005_CDDB.html, copyright 1998 Rocco Caputo, printed Jul. 3, 2009, 6 pages.

"The Mp3/Tag Studio Homepage," http://www.magnusbrading.com/mp3ts/, printed May 17, 2007, 1 page.

"Tag&Rename—easy to use mp3 tag editor," http://www.softpointer.com/tr.htm, copyright 1999-2007 Softpointer Inc, printed May 17, 2007, 2 pages.

"MUSICSTRANDS.COM Because Music is Social," copyright 2006 MusicStrands, Inc., 2 pages.

"Start listening with Last.fm . . . and get a station with music you'll like," http://www.last.fm/, copyright 2002-2007 Last.fmLtd., printed Oct. 4, 2007, 2 pages.

"Listen with Last.fm and fuel the social music revolution," http://www.last.fm/tour/, copyright 2002-2007 Last.fm Ltd., printed Oct. 4, 2007, 1 page.

"Share your music taste," http://www.last.fm/tour/share/, copyright 2002-2007 Last.fm Ltd., printed Oct. 4, 2007, 1 page.

"Discover music with a little help from the fans," http://www.last.fm/tour/discover/, copyright 2002-2007 Last.fm Ltd., printed Oct. 4, 2007, 1 page.

"Mercora—Music Search and Internet Radio Network," at <http://www.mercora.com/overview.asp>, copyright 2004-2006, Mercora, Inc., printed Aug. 8, 2006, 1 page.

"NoviiMedia / Palm OS Solutions / NoviiRemote Blaster for Treo 650," at <http://www.novii.tv/palm/blaster/>, copyright 2000-2009, Novii, printed Oct. 16, 2009, 4 pages.

"NoviiMedia / Palm OS Solutions / NoviiRemote Deluxe for Palm OS," at <http://www.novii.tv/palm/deluxe/>, copyright 2000-2009, Novii, printed Oct. 16, 2009, 2 pages.

Abstract, Keller, A. M. et al., "A predicate-based caching scheme for client-server database architectures," The VLDB Journal, vol. 5, No. 1, Jan. 1, 1996, pp. 35-47, 2 pages/

"Backing up your music files in iTunes 4," at <http://support.apple.com/kb/TA47619>, last modified Feb. 18, 2012, some information on this page dates back to Oct. 2005 as found on the Internet Archive, Apple, Inc., printed Mar. 15, 2012, 3 pages.

"Full Version: iTunes 4.0.1 available via software update," at <http://www.techsurvivors.net/forums/lofiversion/index.php?t2235.html>, copyright 2001-2012, Invision Power Services, Inc., posts dated May 27-31, 2003, 5 pages.

"iTunes 4: Tips and Tricks," at <http://docs.info.apple.com/article.html?artnum=93120>, last modified Sep. 18, 2003, Apple, Inc., printed Mar. 15, 2012, 1 page.

"iTunes 4: What's New," at <http://docs.info.apple.com/article.html?artnum=93141>, last modified Jun. 23, 2004, Apple, Inc., printed Mar. 29, 2012, 1 page.

"iTunes Tracker," at <http://www.macupdate.com/app/mac/12088/itunes-tracker>, date unknown but postings dated as early as Jun. 23, 2003, copyright 2012, MacUpdate LLC, printed Mar. 15, 2012, 2 pages.

Keller A.M. et al., "A Predicate-based Caching Scheme for Client-Server Database Architectures," The VLDB Journal, vol. 5, No. 1, Jan. 1, 1996, received Nov. 1994, copyright 1996, Springer-Verlag, pp. 35-47, 13 pages.

Nilsson, M., "ID3 tag version 2.3.0," at <http://web.archive.org/web/20050305120402/http://www.id3.org/idev2.3.0.txt>, Feb. 3, 1999, printed Mar. 16, 2012, 32 pages.

"PKZIP 2.50 for DOS *User's Manual*," at <http://1.zammit.free.fr/pkzip/MANUAL.TXT>, copyright 1989-1999, PKWARE Inc., printed Mar. 16, 2012, 68 pages.

* cited by examiner

ABC MEDIA CENTER  132  HOME  ABOUT US  DOWNLOADS  COMMUNITY  CONTACT  HELP

REGISTRATION INSTRUCTIONS  134  Fill out the information in sections 1-4 below and select the "I Agree" button to register and establish your user account.  133

130

① CREATE YOUR ID  136
* First name: _____  146
* Last name: _____  148
* Email: _____ (This should be your primary email account.)  150  152
* Password: _____ (Six characters or more; capitalization counts.)  154
* Re-enter: _____  156

② VERIFY YOUR REGISTRATION  138
* Enter the code shown: _____  158  160
(This helps to prevent automated registrations.)  162

③ IF YOU FORGET YOUR PASSWORD  140
* Security question: [Select a question: ▼]  164  166

④ TERMS OF USE  142
Please review the following terms and indicate your agreement below.  Printable Version  168

1. ACCEPTANCE OF TERMS
Concert Technology, Corp. welcomes you. Concert Technology provides its service subject to the following Terms of Use ("TOU"), which may be updated by us from time to time without notice to you. You can review the most current version  170

▶ By clicking "I Agree" below you agree and consent to the Terms and Use and Privacy Policy.  172

[ I Agree ]  174   [ I Do Not Agree ]  176

*FIG. 5A*

| Title | Time | Artist | Album | Score | Genre | Year | Received | Played | Source | Recommender |
|---|---|---|---|---|---|---|---|---|---|---|
| >Vicious World | 3:17 | Rufus Wainwright | Want One | ■ | Rock | 2004 | 1:17AM/1may | 1:17AM/1may | eStore | Jen365 |
| Pretty Things | 4:22 | Rufus Wainwright | Want One | ▨ | Rock | 2004 | 1:22AM/1may | 1:22AM/1may | Local(Home) | Jen365 |
| Let Me Go | 3:33 | Sonya Kitchell | Words Came... | ▨ | Pop | 2006 | 2:44AM/1may | 2:44AM/1may | Work | Penelope |
| In God's Country | 5:01 | U2 | The Joshua... | ▨ | Rock | 1993 | 3:12AM/1may | 3:12AM/1may | Download | Michael123 |
| All of My Days | 4:45 | Alexi Murdoch | Time Without... | ▨ | Alternative | 2005 | 3:55AM/1may | 3:55AM/1may | Local | HughABC |
| Forget About It | 3:21 | Allison Krauss | Forget About It | ▨ | Country | 2001 | 4:11AM/1may | 4:11AM/1may | eStore | GeneTheMan |
| Hypnotized | 4:35 | Ani Difranco | Reprieve | ▨ | Alternative | 2006 | 4:35AM/1may | 4:35AM/1may | eStore | GeneTheMan |
| Studying Stones | 5:12 | Ani Difranco | Knuckle Down | ▨ | Alternative | 2005 | 5:12AM/1may | 5:12AM/1may | eStore | GeneTheMan |
| Strange & Beau | 4:24 | Aqualung | Strange | ▨ | Rock | 2006 | 6:44AM/1may | 6:44AM/1may | Laptop | WaymenA |
| Vicious World | 3:17 | Rufus Wainwright | Want One | ▨ | Rock | 2004 | 1:17AM/1may | 1:17AM/1may | Work | Jen365 |
| Pretty Things | 4:22 | Rufus Wainwright | Want One | ▨ | Rock | 2004 | 1:22AM/1may | 1:22AM/1may | eStore | Jen365 |
| Let Me Go | 3:33 | Sonya Kitchell | Words Came... | ▨ | Pop | 2006 | 2:44AM/1may | 2:44AM/1may | Work | Penelope |
| In God's Country | 5:01 | U2 | The Joshua... | ▨ | Rock | 1993 | 3:12AM/2may | 3:12AM/2may | eStore | Michael123 |
| All of My Days | 4:45 | Alexi Murdoch | Time Without... | ▨ | Alternative | 2005 | 3:55AM/2may | 3:55AM/2may | Work | HughABC |
| Forget About It | 3:21 | Allison Krauss | Forget About It | ▨ | Country | 2001 | 4:11AM/2may | 4:11AM/2may | PMP | GeneTheMan |
| Hypnotized | 4:35 | Ani Difranco | Reprieve | ▨ | Alternative | 2006 | 4:35AM/2may | 4:35AM/2may | Local(Home) | GeneTheMan |
| Studying Stones | 5:12 | Ani Difranco | Knuckle Down | ▨ | Alternative | 2005 | 5:12AM/2may | 5:12AM/2may | eStore | GeneTheMan |
| Strange & Beau | 4:24 | Aqualung | Strange | ▨ | Rock | 2006 | 6:44AM/2may | 6:44AM/2may | Local(Home) | WaymenA |
| Vicious World | 3:33 | Rufus Wainwright | Want One | ▨ | Rock | 2004 | 7:22AM/2may | 7:22AM/2may | Laptop | GeneTheMan |
| Pretty Things | 5:01 | Rufus Wainwright | Want One | ▨ | Rock | 2004 | 8:34AM/2may | 8:34AM/2may | Laptop | WaymenA |

FIG. 7

METHOD AND SYSTEM FOR COLLECTING INFORMATION ABOUT A USER'S MEDIA COLLECTIONS FROM MULTIPLE LOGIN POINTS

FIELD OF THE INVENTION

The present invention relates to dynamically collecting information about a user's media collections from multiple or disparate login points. Enhanced media related services can be performed with a more complete knowledge of the user's media collections rather than just a single media collection from a single login point.

BACKGROUND OF THE INVENTION

In recent years, there has been an enormous increase in the amount of digital media, such as music and video, available online. Services, such as Apple's iTunes® for example, enable users to legally purchase and download music. Other services such as Yahoo!® Music Unlimited and RealNetwork's Rhapsody® provide access to millions of songs for a monthly subscription fee. These downloading and subscription-based services are provided by systems that are accessible by computing devices over the Internet. As a result, music and video content have become much more accessible to listeners and viewers from any location having Internet connectivity worldwide.

In today's environment, users often own or use multiple computing devices in their everyday life. Users access their computing devices to download or access media based content from media systems and related servers. These computing devices can include, but are not limited to, home computers, laptop computers, computers at work, handheld computers and devices including personal digital assistants (PDAs) and portable media players (PMP), and wireless devices including cellular phones. In this regard, media systems provide for user accounts. This allows a user to login to the media system to access their account from any of the user's devices using a single user id and login. The ability of the user to access media systems from multiple devices has further increased the accessibility of digital media. A user account not only provides an enhancement to the user being able to access their account to obtain media from multiple devices and locations, but also provides enhanced revenues for downloading and subscription based services. The more accessible the digital media, the more likely users are to download or access content.

However, because a user often owns or uses more than one computing device to login to a media system, each of the user's devices may contain different media content. For example, a home computer may contain digital media content from the user's home collection as well as certain content downloaded from a media server. The user's wireless mobile device may contain digital media accessed from a subscription-based service as well as some or all of the user's home collection. When the user logs in to the media system, only the user's media collection stored on the computing device being used by the user to login at that time is "seen" by the media system for providing various user features.

For example, a media system may collect statistics and recommend media content to a user based on previously downloaded content, or attributes of the user's media collection. Similarly, recommendations may come from peer devices associated with the user's prior established "friends" or buddy list like that described in co-pending U.S. patent application Ser. No. 11/484,130 entitled "P2P NETWORK FOR PROVIDING REAL TIME MEDIA RECOMMENDATIONS," filed on Jul. 11, 2006, and incorporated herein by reference in its entirety. If the media recommendation is already present in the user's media collection, the recommendation may be filtered, or the system may be configured to indicate to the user that the recommendation is already in their media collection. A media system may provide other services based on knowledge of the user's media collection.

However, if only the media collection stored on the currently in-use user device can be accessed or "seen" by a media system, the media system may only provide recommendations based on a partial list of the user's entire media collection. The user's actual media collection may include additional content stored on another of the user's devices. For example, a media recommendation may not be properly filtered if the media system does not have knowledge that the recommendation is already stored on another of the user's devices. As such, there is a need for a system and method to gather knowledge of the user's media collections stored on each of the user's computing devices that login to a central computing system or media server so that media collection based services can be provided with a more accurate picture of the user's owned media collections over multiple login points or computing devices.

SUMMARY OF THE INVENTION

The present invention is a system and method for collecting and storing information at a central location or server about a user's various media collections from multiple login points and user devices. A central server receives information about the user's media collection stored on a particular user device when the user logs in to the central server under an established user account. In this manner, a central server can obtain knowledge of all the user's media collections as the user logs in to the central server for each of the user's computing devices. This is opposed to the central server only having knowledge of the media collection for the user's connected and currently in-use device. The user can access the central server to see all of their media collection stored over all of their various computing devices, wherein each device may own different or overlapping media collections.

The user's media collections may be stored over different user devices representing multiple login points, such as a home computer, work computer, laptop computer, and wireless PMP device, for example. In order for the user to register their various media collections, the user first establishes a user account having an associated user id and password at the central server. A client application is downloaded to the user device to establish a web-based application programming interface (API) connection between the user device and the central server. Subsequently, each time the user logs in to a central server using the client application from one of their various user devices, the central server receives a unique machine identifier (MID) of the particular user device connected and in-use. The central server then receives information about the user's media collection owned by the connected and in-use device. The central server stores the media collection owned by the connected and in-use user device under its MID under the user's account.

In this manner, the central server can gather knowledge of all of the user's media collections stored over multiple of the user's devices at one location. The central server can send information to the client application to allow the user to see all of the media collections stored on the user's various disparate computing devices from a single session established from only one of the user's login points.

Recommendations for other media content provided to a user can now be made based on a more complete knowledge of the user's media collection rather than only the media collection stored on the user's in-use devices. The user can determine and/or be informed by the central server if the user already owns a particular media content in the user's collections before requesting a new download from the central server. The central server can also inform the user, via the client application, of any redundancy between the user's media collections on the various user devices or login points.

In one embodiment, the client application may allow the user to give a human-readable name to each of his or her user devices that are registered with the central server. The central server can also allow multiple and persistent sessions from the same user from different user devices or login points for accessing media content based services from the central server. Primary and secondary sessions can be established and controlled to automatically control where requested content is downloaded.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 5A illustrates an exemplary registration web page for establishing a user account at the central server;

FIG. 7 illustrates an exemplary media collection displayed on the user's device by the client application;

DETAILED DESCRIPTION OF THE PREFERRED EMBODIMENTS

Figure 1:
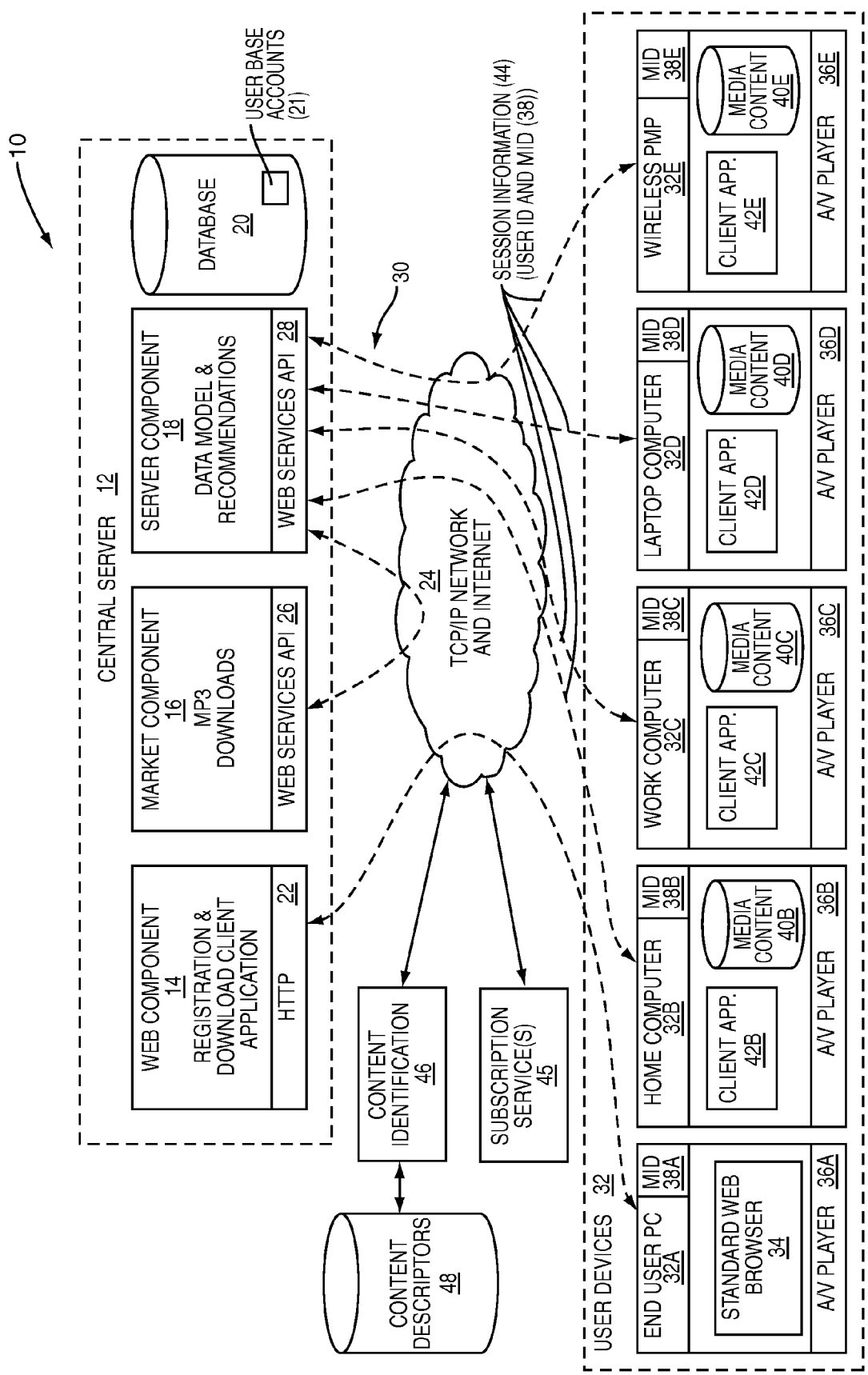
FIG. 1 illustrates a system for dynamically collecting information about a plurality of user's media collections from multiple or disparate login points according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a system and method for collecting and storing information at a central location or server about a user's various media collections from multiple login points and user devices. A central server receives information about the user's media collection stored on a particular user device when the user logs in to the central server under an established user account. In this manner, a central server can obtain knowledge of all the user's media collections as the user logs in to the central server for each of the user's computing devices. This is opposed to the central server only having knowledge of the media collection for the user's connected and currently in-use device. The user can access the central server to see all of their media collection stored over all of their various computing devices, wherein each device may own different or overlapping media collections.

The user's media collections may be stored over different user devices representing multiple login points, such as a home computer, work computer, laptop computer, and wireless PMP device, for example. In order for the user to register their various media collections, the user first establishes a user account having an associated user id and password at the central server. A client application is downloaded to the user device to establish a web-based application programming interface (API) connection between the user device and the central server. Subsequently, each time the user logs in to a central server using the client application from one of their various user devices, the central server receives a unique machine identifier (MID) of the particular user device connected and in-use. The central server then receives information about the user's media collection owned by the connected and in-use device. The central server stores the media collection owned by the connected and in-use user device under its MID under the user's account. The term "owned" in this context means owned, stored, leased, or accessible by or from the user device.

In this manner, the central server can gather knowledge of all of the user's media collections stored over multiple of the user's devices at one location. The central server can send information to the client application to allow the user to see all of the media collections stored on the user's various disparate computing devices from a single session established from only one of the user's login points.

FIG. 1 illustrates a system 10 for providing a central server 12 that maintains a record of a user's various media collections owned by multiple user devices or login points under the user's account established on the central server 12. The primary purpose of the central server 12 is to manage the flow of information and services provided to users of the system 10, including but not limited to receiving requests for and establishing new user accounts, managing and storing user account preferences, storing information about the user's media collections, and managing the flow of recommendations for media content to users. In a preferred embodiment, the central server 12 operates in a client-server relationship with users rather than a direct peer-to-peer connection, although the present invention may be implemented in a peer-to-peer configuration where features of the central server 12 are distributed among one or more peer nodes or devices. The central server 12 provides media based services to the user as long as the user's device is actively connected to the central server 12. Note that the central server 12 may be implemented as a number of servers operating in a collaborative fashion.

The central server 12 is comprised of several components to facilitate user connections and provide media related services to the user. These components are comprised of a web component 14, a market component 16, and a server component 18. The central server 12 also contains a database 20 that stores data necessary to support the components 14, 16, 18 and to store user base accounts 21 for users that have registered and established accounts to use the services provided by the central server 12.

Turning to the central server components 14, 16, 18, the web component 14 provides users access to registration services so that users can create the user base account 21 and have permission to access services provided by the central server 12. The web component 14 also provides the client application downloading functionality to devices that interface with the central server 12. The client application software is executed on the user's computing devices to login, access, and receive the various media-based services from the central server 12. The web component 14 contains an HTTP component 22 that provides Internet communication protocol support for communication to users, registration support, and client application downloading, via an Internet based network 24.

The market component 16 includes a web services application program interface (API) 26 to provide downloadable media content to users. The downloaded content may include songs or video, and may be of any format type desired, including but not limited to MP3. The server component 18 also contains a web services API 28 to communicate with external devices over the network 24. The server component 18 contains data models and recommendation logic that controls the overall services provided by the central server 12, such as providing media content recommendations to users based on the user's preferences and/or media collection as will be described in more detail below.

The central server 12 is also able to communicate with subscription services 45 for accessing media content for downloading. Some media content requested may not be stored locally in the central server's database 20, but rather obtained from subscription services 45 only when needed or on-demand. Further, the central server 12 can communicate over the network 24 with content identification systems 46 to provide identifying and other characteristic information about media content, such as information regarding artists, song titles, genre, etc. in the example of song content in particular. The allows the central server 12 to provide users with user friendly information about media content as part of the services provided by the central server 12. The identification systems 46 may be coupled with or contain content descriptors 48 that are compared media content to identify and provide information regarding the media content. For an example of songs in particular, the descriptors 48 may include known fingerprints and/or Global Unique IDs (GUIDs) to identify songs and obtain metadata containing information about the songs, such as title, artist, genre, etc. A uniform resource locator (URL) may be included to identify location (s) for the descriptor information.

The central server 12 is adapted to communicate and connect with multiple user devices 32 to provide services to an end-user. The user devices 32 may be any type of computing device that is capable of performing communications over the network 24 to reach the central server 12. Examples of user devices 32 include, but are not limited to, home computers 32B, computers at work 32C, laptop computers 32D, wireless PMP devices 32E, hand-held computer devices, such as personal digital assistants (PDA) with remote communication capabilities, and the like. A web browser 34 may be included within each user device 32 to provide the user an interface for Internet based communications including those with the central server 12. The user devices 32 may also contain an audio/video (A/V) player 36 that allows the user to play back any media content 40 stored locally at the user device 32 or accessed remotely, such as from the central server 12.

Each user device 32 that desires to access and receive the services of the central server 12 first establishes a user base account 21 using a standard web browser 34 or other standard Internet communication interface. This allows the user device 32 to download a client application 42 onto the user device 32 using the web component 14 services of the central server 12 to provide a customized software interface to the central server 12. After the client application 42 is downloaded onto a user device 32 from the central server 12, the user device 32 uses a web services API connection to communicate with the market and server components 16, 18 of the central server 12 to receive media content based services via the user device 32.

According to the invention, each user device 32 includes some form of a machine identifier (MID) 38 that is unique to each user device 32. The MID 38 may be a MAC address, a serial number, or an IP address, for example. This allows the central server 12 to store information about all of the user's media content 40 spread over each the user's user devices 32 or login points according to individual MIDs 38 since some or all of the user devices 32 contain different media content 40. When the user device 32 establishes a session with the central server 12 using the client application 42, the MID 38 and session information or ID 44 is transmitted to the central server 12. By providing the MID 38 of the user device 32 when establishing a connection to the central server 12, allows the central server 12 to distinguish interaction and services for the user based on the particular user device 32. For example, the user may have multiple user devices 32 that he or she desires to download the client application 42 to and access the services of the central server 12. The client application 42 is programmed to extract the MID 38 from the user device 32 as part of establishing a connection and session with the central server 12 when the user activates the client application 42.

Figure 2:
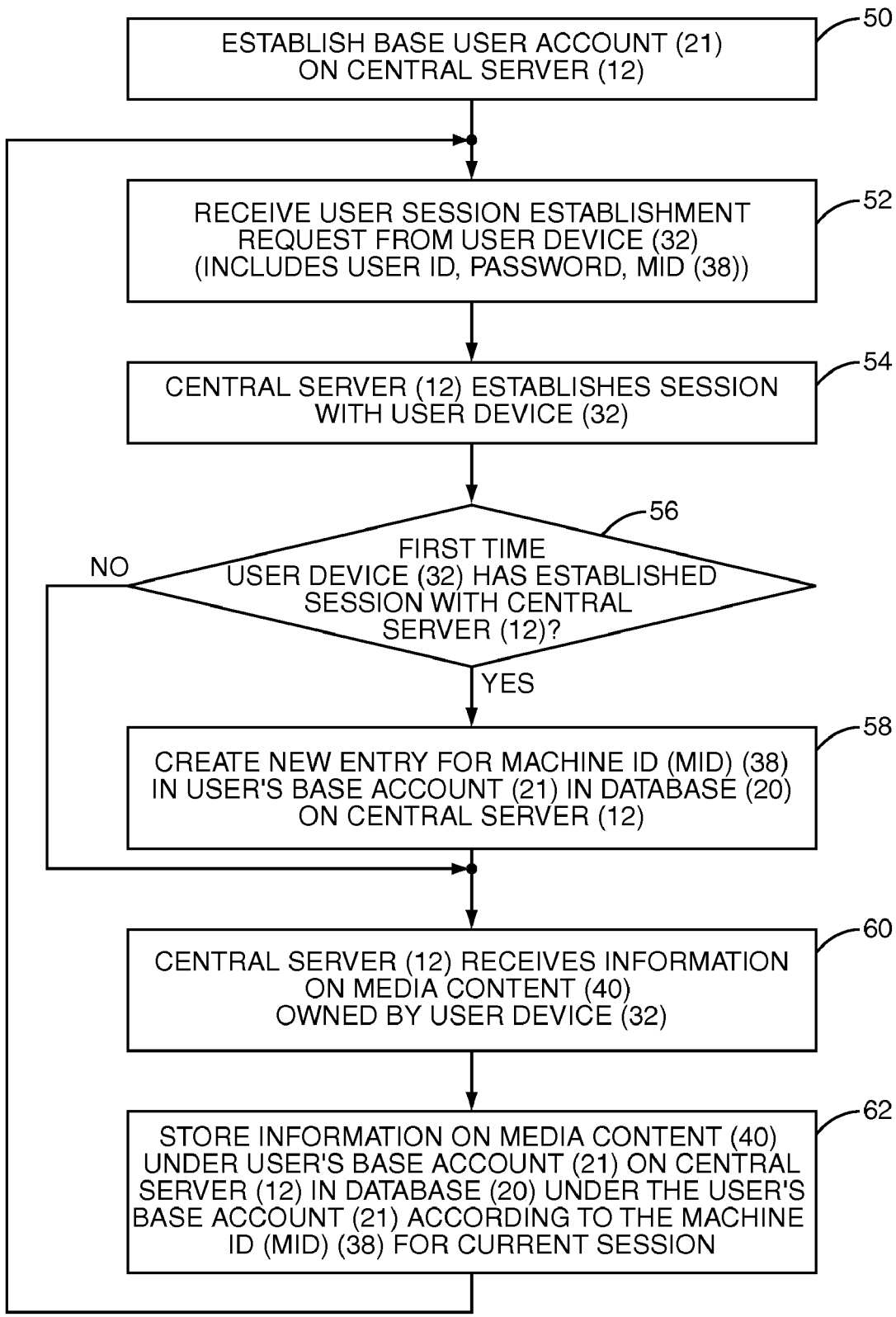
FIG. 2 illustrates a flow chart of user account establishment and storage of information about the user's media collection information on the various user devices that login to the central server.

FIG. 2 illustrates a flow chart of the basic operation of the central server 12 for establishing a user base account 21 and storing information about a user's media content or collection 40 owned by a user device 32 when the user device 32 is logged into the central server 12. This process may be implemented using the system 10 illustrated in FIG. 1. First, the central server 12 establishes the user base account 21 in the database 20 using a standard communication interface, such as a web browser (step 50). This is because a user base account 21 must be created first before the client application 42 is downloaded to the user device 32. A user base account 21 is then established on the central server 12. A password and user id for the user are created by the central server 12 and returned to the user via the user device 32. Alternatively, a user id and password selected by the user is received from the user device 12. The user id allows a user to login to their account 21 on the central server 12 from any user device 32 or login point desired. If the user id is available, the central server 12 correlates to the user base account 21 to the user id and password for access by the user.

Next, the central server 12 receives a user session establishment request from the user device 32 using the downloaded client application 42 (step 52). The session establishment request includes the user id and password to access the correct user base account 21. The session establishment request also includes the MID 38 of the user device 32 making the connection request since the user id and password may be used to access the central server 12 from any number of different user devices 32 or login points. Thereafter, the central server 12 establishes a session with the user device 32, which may be one of many user devices 32 owned by a particular user (step 54). If it is the first time that the particular user device 32 has requested a session establishment for a particular user (based on the MID 38) (decision 56), the central server 12 creates a new entry for the MID 38 in the user's base account 21 in the database 20 (step 58). This is so the information about the user's media content or collection 40 owned by the user device 32 can be stored in the database 20 under a particular MID 38 under the user's base account 21. This allows the central server 12 to uniquely distinguish information about the user's media collections based on the MID 38 of the user device 32.

Whether the user device 32 is establishing a session with the central server 12 for the first time or not, the central server 12, after the connection and session are established, receives information about the media content 40 owned by the user device 32 (step 60). Content identification may be optionally performed using the content identification server 46 like that described in U.S. patent application Ser. No. 11/392,051, entitled "SYSTEM AND METHOD FOR ARCHIVING A MEDIA COLLECTION," filed Mar. 29, 2006, incorporated herein by references in its entirety. The central server 12 then stores the information necessary to identify the media content 40 (e.g. GUIDs, metadata, etc.) in the user's base account 21 in the database 20 under the MID 38 of the user device 32 (step 62). At this point, the central server 12 has information about the user's media content or collection 40 stored on the user device 32. If the user logs in to the central server 12 from each of its user devices 32, the central server 12 will collect and store information about each of the user's media content 40 on each of its user devices 32 according to the device's MID 38. This allows the central server 12 to provide media related services to the user with a more complete knowledge of the user's owned media content 40.

Figure 3:
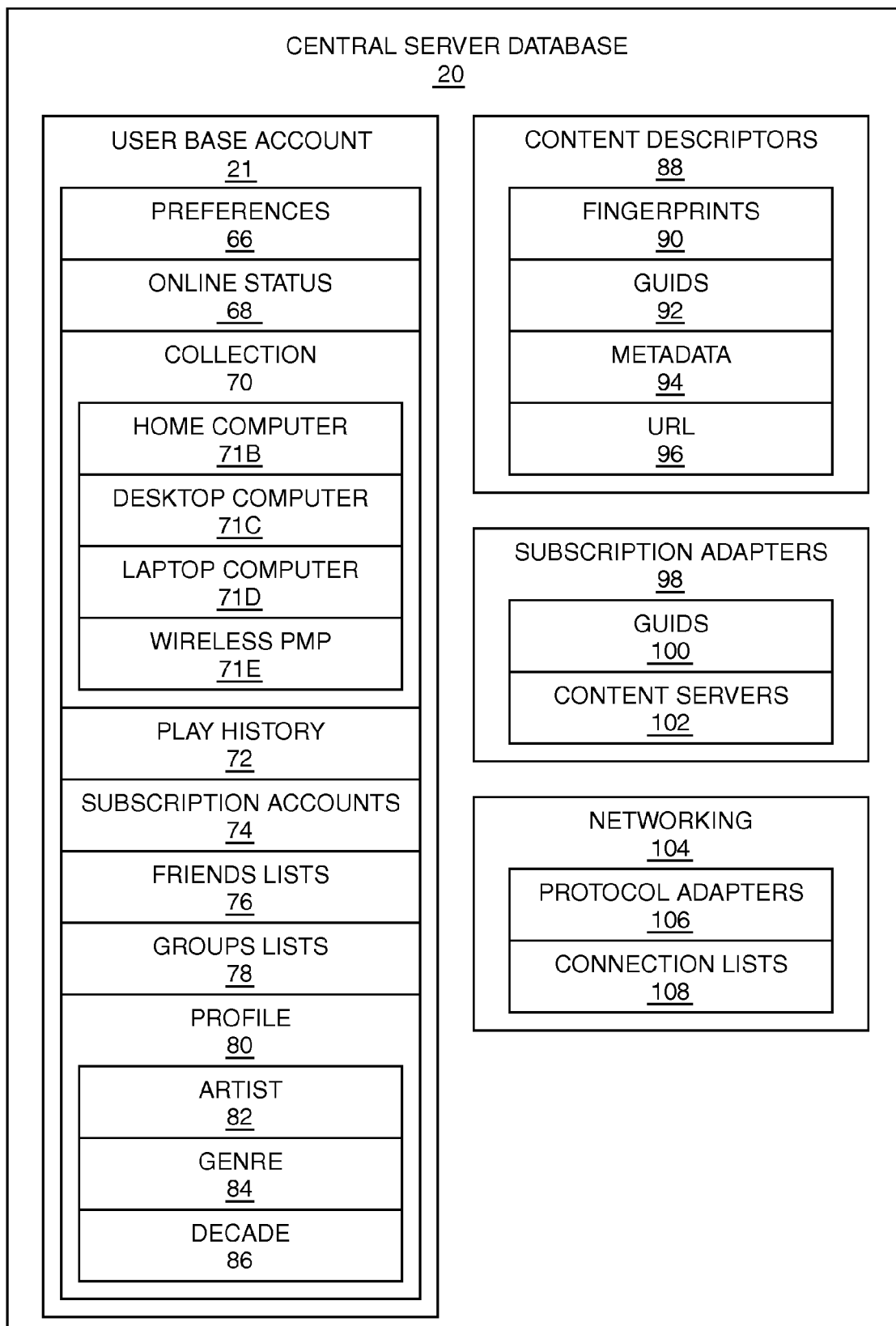
FIG. 3 illustrates one embodiment of the central server database memory structure for storing information relating to media services and the user's account.

FIG. 3 illustrates an example of database records organization within the central server database 20. User base accounts 21 are created for each new user registered with the central server 12. Within each user base account 21 are the user's preferences 66, their online status 68, and the user's media collection information 70. The user preferences 66 may be indicated as part of the user registration process to establish a new account on the central server 12. The user preferences 66 may include general application settings, the user's media preferences (e.g. genre artists, decades or time periods of release, etc.), downloading preferences, recommendation preferences, and other account information for example. The online status 68 is a field that indicates whether a user has at least one established connection to their user base account 21 via a user device 32. In this manner, the central server 12 can make decisions about downloading content based on whether the user is online 68 and based on which user devices 32 are online. A user may establish more than one connection with the central server 12 at one time using multiple user devices 32 or login points as will be described later in this application.

Information about the user's media collections obtained by the central server 12 from each unique user device 32, as determined by their MID 38, are stored in the collection record 70 associated with the user base account 21. Each unique user device 32 will have its own collection record 71B, 71C, 71D, 71E for each user device 32 in which the central server 12 has established a connection. In this manner, the central server 12 can interrogate the collection record 70 to determine the media content owned by the user across the user's multiple user devices 32 that are currently connected or have previously established a connection with the central server 12. Collection information is collected for each of the user devices 32 and stored separately within the collection record 70.

Other information specific to a user may be stored within the user base account 21 on the central server 12. For example, the play history 72 of the media content by the user, the user's subscription accounts 74, a friends list 76, group lists 78, and profile information 80. The profile information 80 includes statistics about the user's media collection 70 such as artist distribution 82, genre distribution 84, and release year distribution 86. Content descriptors 88 are also stored in the database 20 to identify media selections displayed to the user 109, including but not limited to the media in the user's media collections 70. Content descriptors 88 may be obtained over the network 24 from the content identification system 46 previously described above in FIG. 1.

Subscription adapters 98 contain information that allow the central server 12 to quickly determine if a particular subscription service offers a particular media selection or request. If not, the central server 12 can move on to another subscription service for the same inquiry. The subscription adapters 98 include GUIDs 100 of media content accessible from the subscription services 45 and content server information 102 about how to access content servers for the subscription servers that house content. The database 20 also contains network information 104, which includes protocol adapters 106 and connection lists 108 to allow the central server 12 to communicate using different protocols to establish different types of connections with user devices 12.

Figure 4:
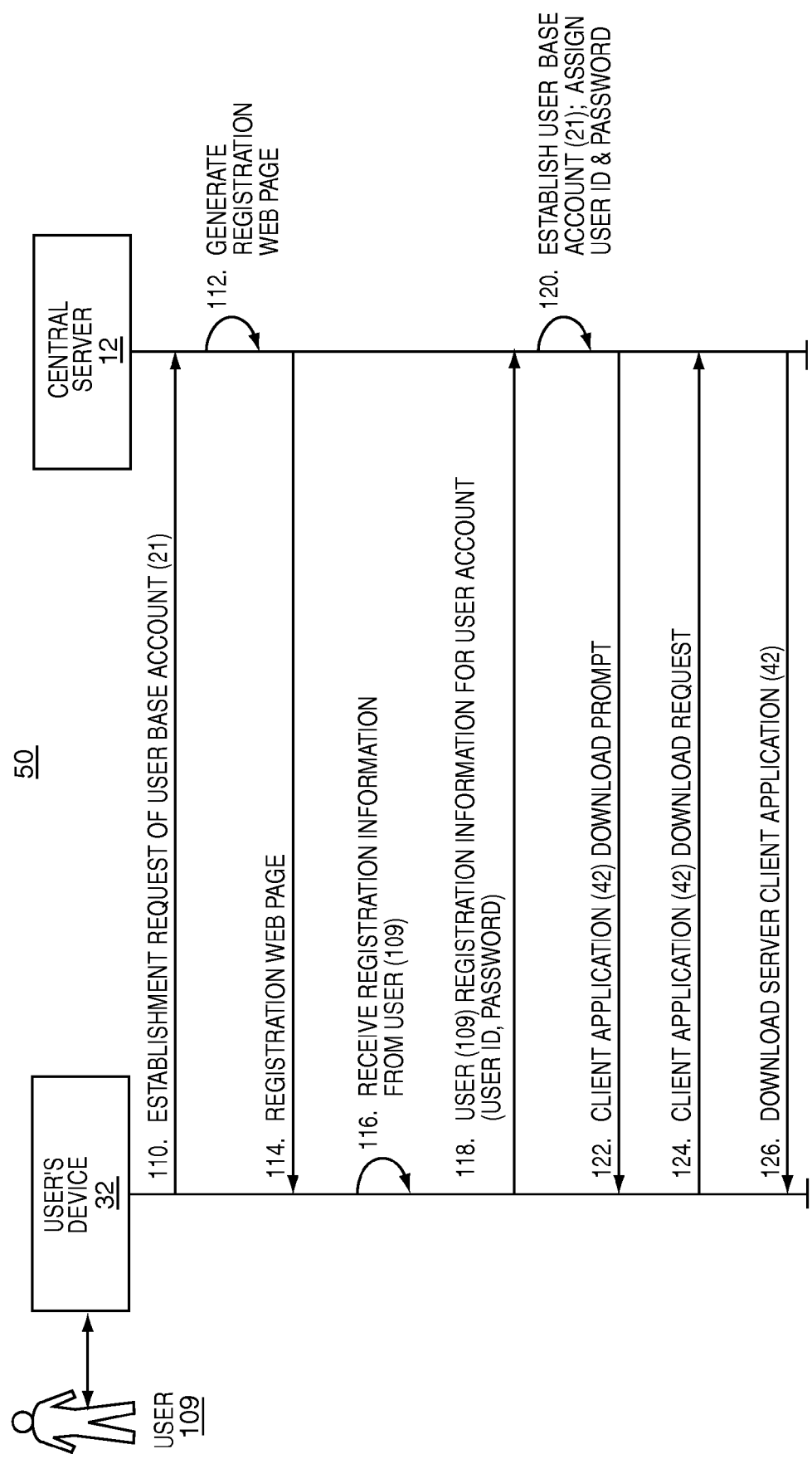
FIG. 4 illustrates a communication flow diagram between a user's device and the central server for establishment of a user account on the central server and downloading a client application to the user's device for connecting to the central server to access the user's account.

FIG. 4 illustrates a communication flow diagram illustrating step 50 of the flowchart in FIG. 2 in more detail. That is, the communication between the user device 32 and the central server 12 to establish a user base account 21 and download the client application 42 to the user device 32. A user 109 interacts with the user device 32 to generate an establishment request for a user base account 21 to the central server 12 (step 110). The central server 12 generates a registration web page (step 112) and sends the registration web page back to the user device (step 114). The registration web page contains fields for information to be provided by the user 109 to establish a user base account 21 at the central server 12. The user device 32 receives the registration information from the user 109 (step 116), and sends the registration information to the central server 12 to establish the user base account 21 (step 118). A desired user id and password may be included in the registration information sent to the central server 12.

Next, the central server 12 establishes the user base account 21 and assigns the user id and password to the account 21 (step 120). This is so that the next time the user logs in to the central server 12 to access the user base account 21, the central server 12 can verify the user id and password provided for necessary permission to access the user base account 21 for security purposes. The central server 12 then downloads a pop-up prompt to the user device 12 asking if the user 109 wants to download the client application 42 (step 122). The client application 42 is an application specifically designed to establish a session with the central server 12 for access to the central server 12 media services. If the user 109 chooses to download the client application 42, the user device 32 sends a download request to the central server 12 (step 124), and the central server 12 downloads the client application 42 to the user device 12. The next time the user 109 desires to access the central server 12 from the user device 32, the user 109 initiates the client application 42 to establish a connection with the central server 12.

An example of a registration web page 130 referenced in the flow diagram of FIG. 4 that may be employed to allow a user to request establishment of a user base account 21 is illustrated in FIG. 5A. Note that the registration web page 130 is a standard web page accessible by a standard browser since the client application 42 has not yet been downloaded to the user device 32. The client application 42 is downloaded after the user 109 has established a user base account 21.

The web page 130 may contain a banner 132, typically comprising the brand name or marketed under name of the central server 12 or its service. The banner 132 may include hyperlinks 133 to allow the user 109 to access additional information or services relating to registration as shown. The web page 130 may include registration instructions 134. Section 1 136 of the web page 130 includes fields 146-156 for user information necessary to establish a user base account 21. Section 2 138 of the web page 130 is an optional code to prevent automated registrations. A code 162 must be entered in a code field 158 manually to continue with successful registration. The code 162 is located below and only readable by human. A question link 160 is provided in the event the user has questions about the code entering process.

Section 3 140 of the web page 130 includes a security question 164 selectable by the user 109, via a security question drop down menu 166, to be answered by the user 109 in case the user forgets his or her password. The central server 12 will store the security question 164 and the answer as a method of verifying a user 109 in lieu of a password and/or to provide a user 109 a password when forgotten or lost. Section 4 142 of the web page 130 contains the "Terms Of Use" section, which includes terms and conditions 168 that are viewable by the user 109 using a scroll bar 170. A consent statement 172 is provided to provide a legally binding contract when the user 109 clicks the "I Agree" link 174 to initiate the account establishment request to the central server 12. If the user 109 does not agree to the terms and conditions 168, the user 109 may select the "I Do Not Agree" link 176, in which case an account establishment request will not be made to the central server 12. The "I Do Not Agree" link 176 is necessary in most jurisdictions to create legally binding "click-wrap" agreement.

Figure 5B:
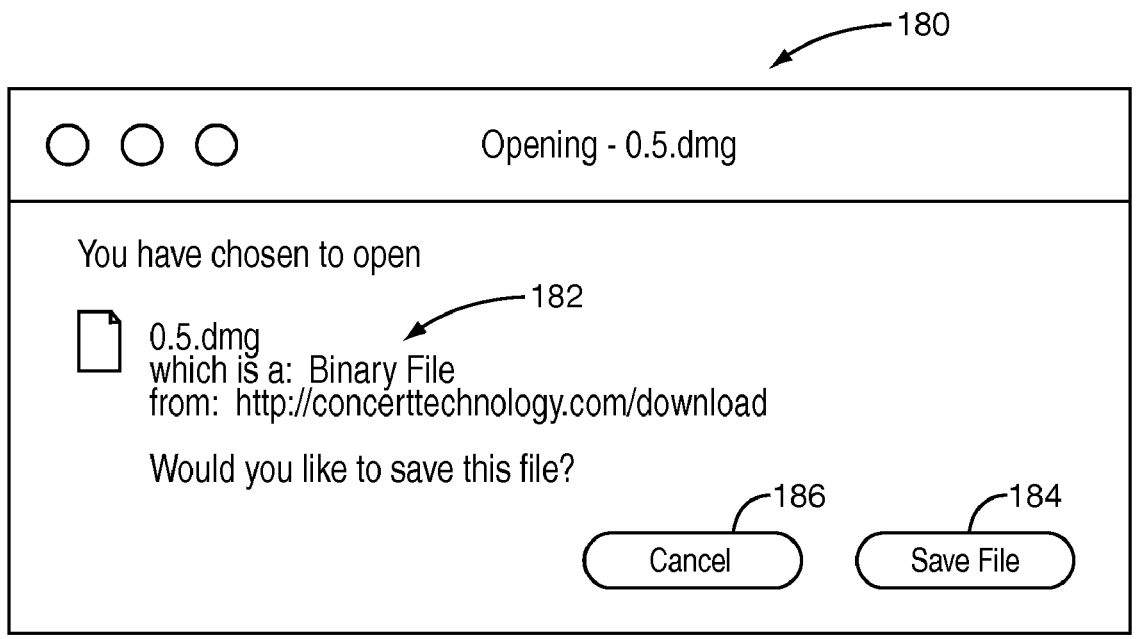
FIG. 5B illustrates an exemplary client application download pop-up for downloading the client application to the user's device.

FIG. 5B illustrates an example of a client application 42 download pop-up or page 180 after the user 109 has provided the information in the registration web page 130 and selected the "I Agree" link 174 to request establishment of the user base account 21. The download pop-up 180 contains information about the file to be downloaded 182 and links to allow the user 109 to save the file ("Save File" link 184), or to cancel the download ("Cancel" link 186). Once the file is downloaded and saved, the user 109 may execute the downloaded file to load the client application 42 on the user device 32. As discussed above, the client application 42 is designed to establish a connection and session with the central server 12 so that the user 109 may access their user base account 21 on the central server 21, the central server 12 receive and store information about the user's media content 40 on the user device 32, and the user 109 receive the media based services provided by the central server 12.

At this point in the exemplary embodiment, the user 109 has requested establishment of a user base account 21 on the central server 12. If the request was proper, the central server 12 establishes the user base account 21 under a user id and password. The user 109 is allowed to download the client application 42 to their user device 32. Next, when the user 109 desires to log in to the central server 12 to receive media related services and to register the media content 40 owned by the user device 32, the user 109 initiates the client application 42.

Figure 6A:
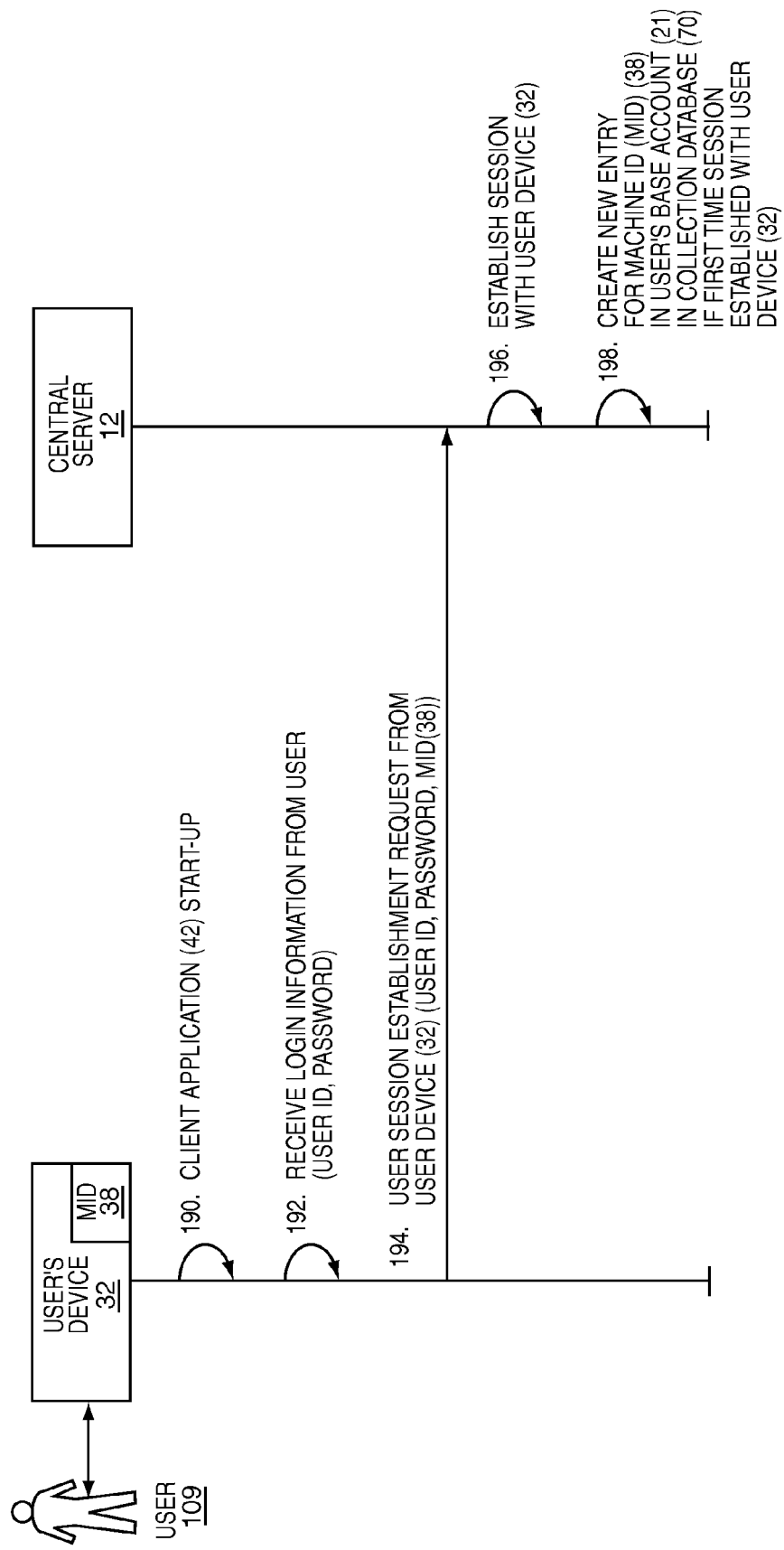
FIGS. 6A and 6B illustrate communication flow diagrams showing communication between the user's device and the central server for initiating the client application, uploading the user's media collection from the in-use user's device to the central server, and performing media based services for the user, via the client application, based on knowledge of the user's various media collections.
Figure 6B:
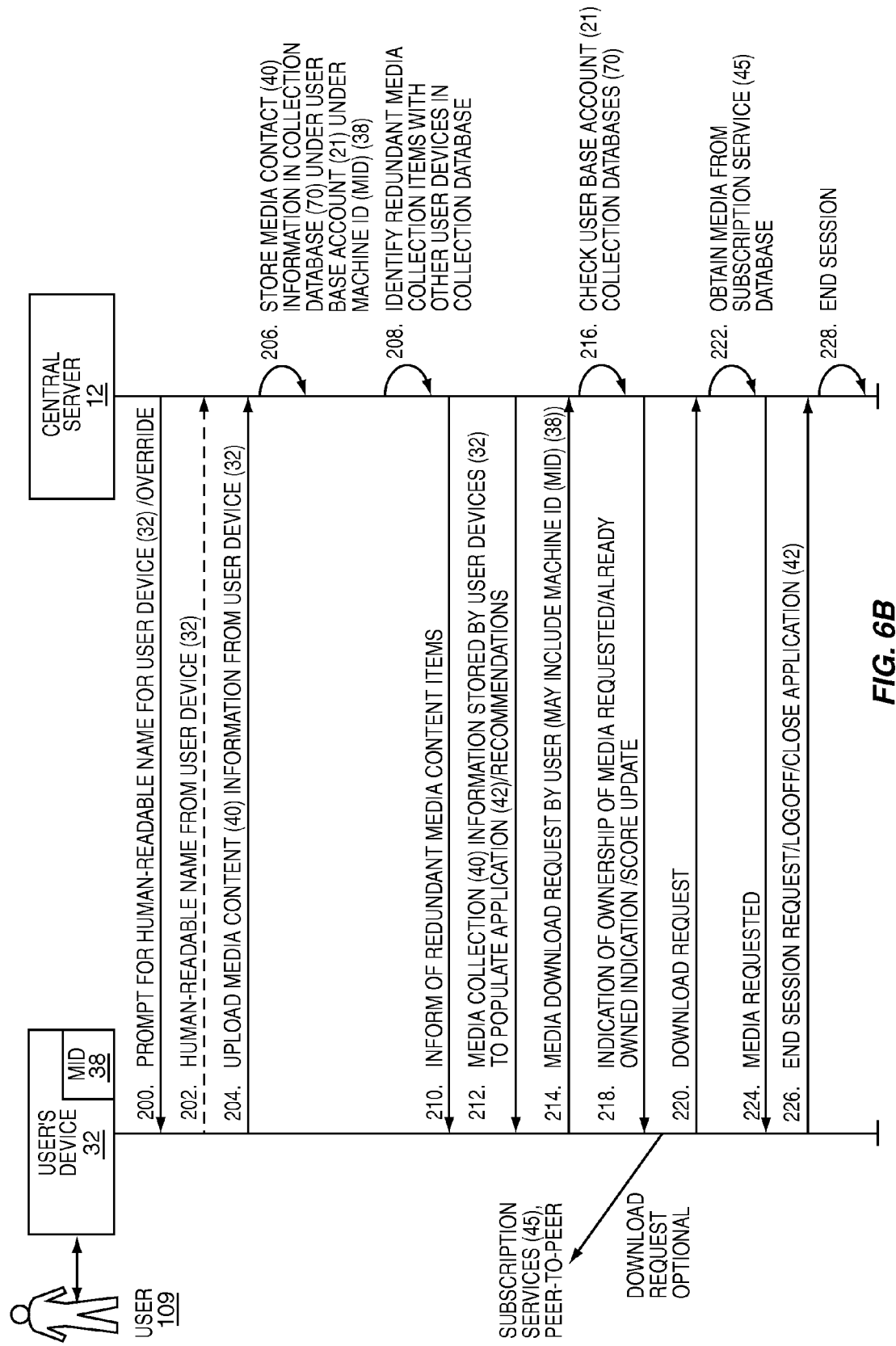

In this regard, a communication flow diagram illustrating communication between the user device 32 and the central server 12 when the client application 42 is initiated is illustrated in FIGS. 6A and 6B. First, the user 109 initiates the client application 42 on the user device 32 (step 190). The client application 42 prompts the user 109 to provide their user id and password for account access (step 192). Next, the client application 42 sends a user session establishment request to the central server 12, which includes the user id, the password, and the MID 38 (step 194). The central server 12 establishes a connection and starts a new session for the user device 32 according to the MID 38 (step 196). If the MID 38 is new for the user's base account 21 (i.e. the first time a session request is made from a particular user device 32), the central server 21 creates a new collection record 71 under the collection record 70 in the user's base account 21 under the new MID 38 so that content 40 owned by the connected user device 32 can be obtained and stored in the database 20 (step 198).

Continuing to FIG. 6B, the central server 12 sends a message to the user device 32 to allow the user 109 to provide a human-readable name for the user device 32 (step 200). This is so a user device 32 will appear in the client application 42 by a user-friendly human-readable name or nomenclature selected by the user 109 rather than an obscure MID 38. If the user device 32 has already been named, the user 109 may override the previous name. If a human-readable name is provided, it is sent back to the central server 12 for storage in association with the MID 38 under the user's base account 21 (step 202). At this point, the client application 42 collects the information about the media content 40 owned by the connected user device 32 and sends this information to the central server 12 (step 204) for storage in the collection record 70 (step 206). This information may include GUIDs, fingerprints, metadata, or the like, or any combination thereof. This is so the central server 12 will have knowledge of the user's media collections 40 in one location to provide media based services to the user 109 based on the user's various media collections stored over multiple user devices 32 or login points. The central server 12 may also identify redundant media content 40 with the other of the user's devices 32 in the collection record 70 (step 208) and inform the user of the redundant items (step 210).

The content server 12 will then send information about the media content 40 stored on the user devices 32 to populate the client application 42 (step 212). The user 109 will be able to access and see all of their media content 40 stored on all of their user devices 32 that are currently connected or have been previously registered through the client application 42. If the user 109 desires to download a particular media item or selection, a request is made to the central server 12 (step 214). The request may include the MID 38 where the selection is stored if the user 109 selects content that is stored on one of the user's devices 32.

The content server 12 can next check the user base account 21 and the collection records 70 to determine if the selected content is already owned by the user 109 on one of their user devices 32 (step 216). If so, the content server 12 can indicate whether the content requested is already owned by the user 109 and/or provide a scoring update to the client application 42 based on whether the content is already owned (step 218). As described in co-pending U.S. patent application Ser. No. 11/484,130 entitled "P2P NETWORK FOR PROVIDING REAL TIME MEDIA RECOMMENDATIONS," previously referenced above, the client application 42 may include a scoring system that is indicative of the user's preference of the content for a particular user 109 based on the user's preferences and/or whether the user 109 already owns the content.

The selected content can next be requested to be downloaded by the user 109 from the central server 12 (step 220), or optionally directly from a subscription service 45 or peer-to-peer connection with another device. Note that recommendations or information identifying media already in the user's collection 70 available from subscription services 45 may include URL or other reference enabling downloads from the subscription service 45. In response to a central server 12 request, the central server 12 can obtain the content request from a subscription service(s) 45, the database 20 if stored therein, or another of the user's devices 32 if a connection is or can be established with such other user device 32 (step 222). The central server 12 can then provide the content requested (step 224) either directly, or by providing information to the user device 32, to allow it to establish a direct peer-to-peer connection with another machine to download the content requested.

Once the user 109 desires to end the current session, the user device 32 may send an end session request or message to the central server (step 226) to cause the central server 12 to end the session and terminate the connection (step 228). Alternatively, the central server 12 may end the session (step 228) on its own if it detects a dropped connection by the user device 32.

FIG. 7 illustrates an example of a populated media collection 240 that may be presented by the client application 42 on the user device 32 to the user 109. The illustrated example is for songs, but such is also applicable for any type of media content including but not limited to video or presentations. As illustrated, a main media collection page or window 242 is provided. The current content being played by the user 109 is shown in a currently playing box 244. User controls 246 are provided to allow the user 109 to control the A/V player 36 on the user device 32, such as reversing, forwarding, and playing selected content. A volume slide control 248 is also provided to allow the user 109 to control the volume of the A/V player 36.

The content populated by the central server 12 and sent to the client application 42 is listed in a content table 250. The content table 250 consists of numerous columns that provide key information about the content to the user 109. A title column 252 provides the title of the content. A time column 254 provides the length or duration of the content when played. An artist column 256 provides the artist of the content. A score column 260 provides a score in terms of importance to the user according to their user preference 66 stored as a result of the registration process and/or determined by the central server 12 based on the owned media content 40 on the user's devices 32. A genre column 262, a year column 264, a received column 266, and a played column 268 provides the genre type, the year of release, the date and time of receipt, and the date and time of the last play of the content.

A source column 270 provides the source or location of the content. Note that the source may be one of the user's devices 32 (i.e. Local (Home) (device currently connected is local device), Work, Laptop, or PMP). With the present invention, the central server 12 is able to provide the client application 42 with the particular user device 32 where the content is stored if the user 109 owns the content on one of its user devices 32. Lastly, a recommender column 272 contains a user id or name of the person or friend that recommended the content to the user 109. The user 109 can establish a list of friends that are able to provide recommendations as disclosed in U.S. patent application Ser. No. 11/484,130 entitled "P2P NETWORK FOR PROVIDING REAL TIME MEDIA RECOMMENDATIONS" previously referenced above. The user 109 is able to navigate the content table 250 by "point and click" to play content, download content, and request content from the central server 12 and/or other sources.

The central server 12 also provides for the ability of multiple user devices 32 or login points to establish multiple sessions for the same user 109 at the same time. This may be desirable if the user 109 wants to keep a persistent connection with one of its user devices 32 with the central server 12, but also wants to establish a separate session with another of its user devices 32 to request and receive media related services provided by the central server 12. For example, a work computer 32C may have a persistent connection with the central server 12, but the user 109 may go home and desire to establish a connection with the central server 12 using the home computer 32B. The central server 12 manages these connections and determines which session is the primary session based on certain rules. Certain functions of the central server 12 may depend on distinguishing between primary or first, and secondary sessions established and active at the same time. For example, recommendations made to the user 109 may be made to the session designated as the primary session only. In this regard, an example of a multiple user device 32 establishment and connection session is illustrated in the flow diagram of FIG. 8.

Figure 8:
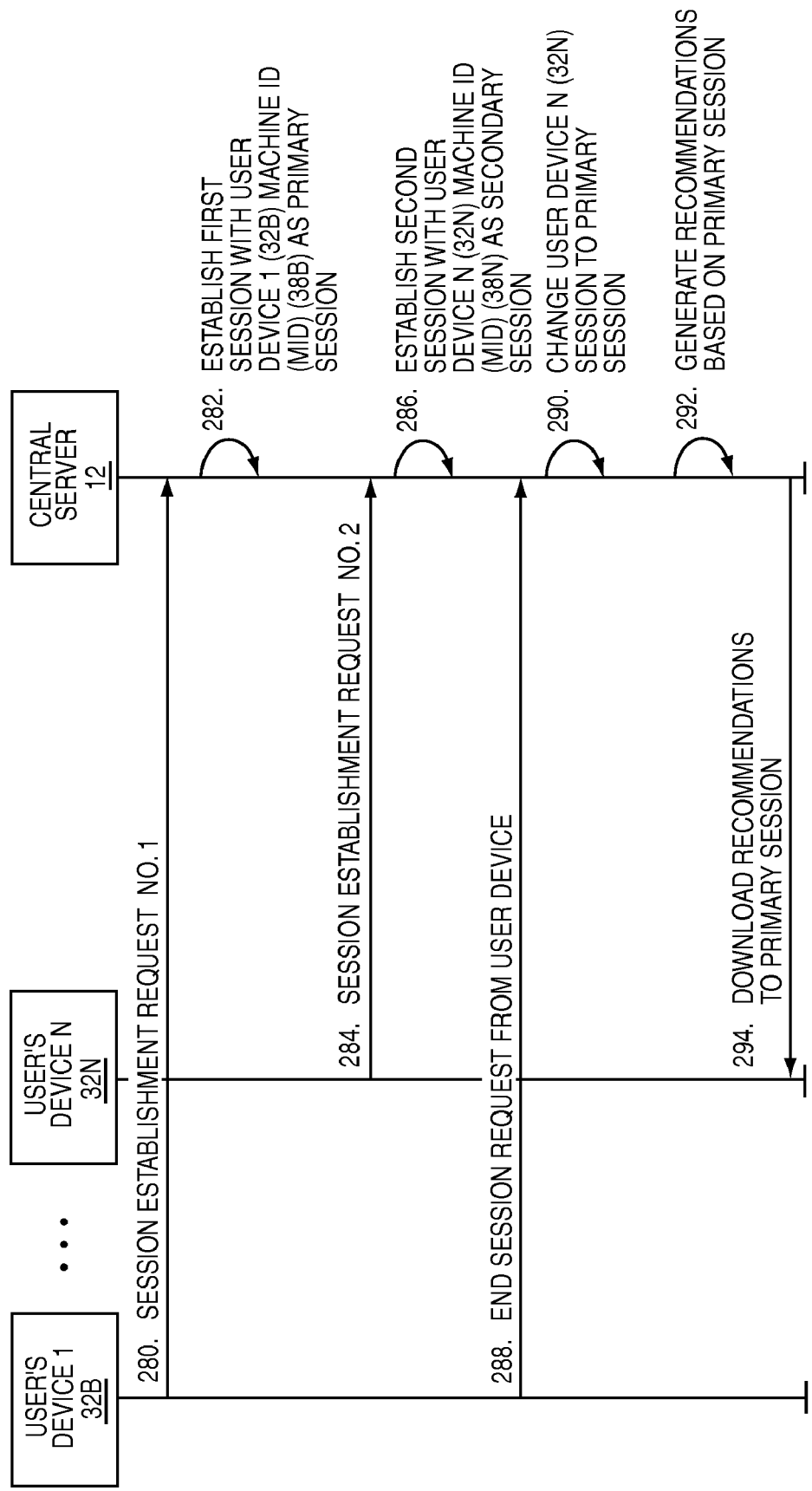
FIG. 8 illustrates a communication flow diagram between multiple user devices logged into the central server at the same time.

In the example of FIG. 8, a first session establishment request is made from a first user device 32B (step 280). The central server 12 establishes the session with the first user device 32B as previously discussed (step 282). Because the user device 32A is the only device connected to the central server 12 that is associated with the user 109 at that time, this session is designated by the central server 12 as the "primary" session (step 282). The user next causes a second of its user devices 32N to establish a separate connection and session with the central server 12 while the first or primary session is still active (step 284). The content server 12 again establishes a session with the second user device 32N, but designates this session as a "secondary" session since a first or "primary" session is still established (step 286). In this example, the first user device 32B sends an end session request to the central server 12 (step 288). The content server 12 will automatically change the designation of the secondary session to the primary session, since the previous primary session is no longer active (step 290). Recommendations may be generated or obtained by the central server 12 (step 292) and downloaded to the user device 32 designated as the primary session (step 294), which in the example is the second user device 32N (step 292).

Figure 9:
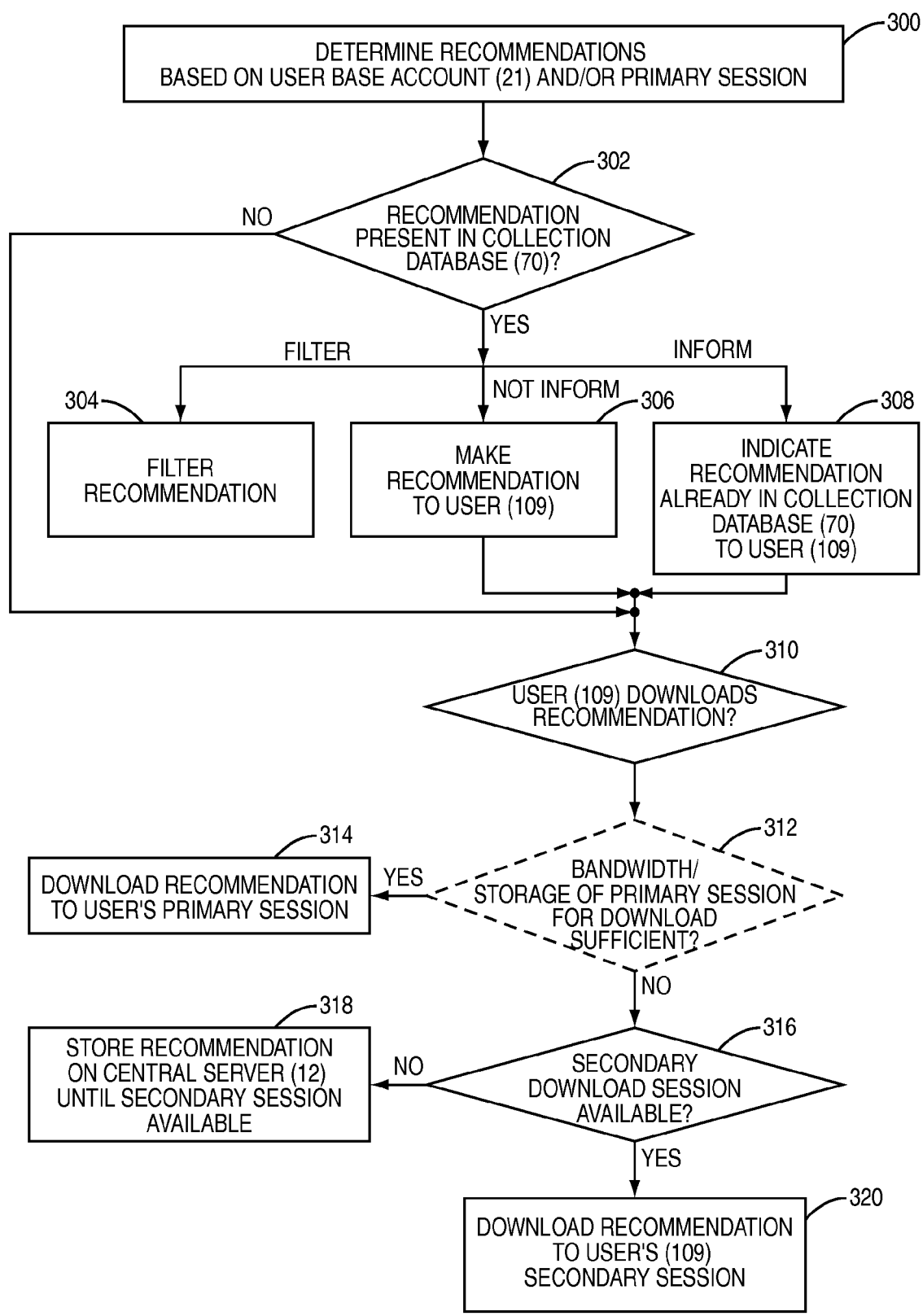
FIG. 9 illustrates a flowchart about media-based services that can be performed by the central server for a user based on the stored information about the user's media collections.

As previously discussed, the content server 12 may make recommendations for content to a user 109. FIG. 9 illustrates a flow chart on how recommendations for content may be made to the user 109, and how the present invention's ability for the central server 12 to have knowledge of the user's media content 40 across multiple user devices 32 or login points can play a role in an improved media recommendation process.

The central server 12 can determine recommendations for the user 109 based on the user base account 21, the user preferences 66, receipt of recommendations based on the user's friends media collections, or the user's media content 40 stored in the collection records 70 (step 300). Now with the enhancement provided by the present invention, the content server 12 can determine if a media recommendation is already owned by the user 109 (i.e. owned in the user's collection database 70 as stored in the database 20 at the central server 12) (decision 302). If so, the central server 12 may filter the recommendation and not deliver it to the user 109, via the client application 42, since the user 109 already owns the recommendation (step 304). Or, the central server 12 may be configured to inform the user 109 of the recommendation, but that it is already owned by the user 109 (step 308). Even further, the central server 12 may be configured to ignore the fact that the recommendation is already owned by the user 109 and make the recommendation to the user 109 without informing the user 109 of the already owned status (step 306). These settings may be made according to central server 12 programming, or based on the user's preferences 66 selected by the user 109 during the registration process.

If the user 109 decides to download the recommendation if informed (decision 310), the central server 12 may perform some optional optimization checking to ensure that the bandwidth and/or storage capacity of the user device 32 associated with the user's primary session is sufficient to efficiently obtain the download (decision 312). If so, or optional decision 312 is not performed, the recommendation is downloaded to the user device 32 associated with the primary session (step 314). If the optional decision 312 is performed, and if the storage and/or bandwidth of the user device 32 associated with the primary session is not sufficient, the central server 12 has the option to download the recommendation to a user device 32 associated with a secondary session (step 320) if a secondary session is active (decision 316). If not, the central server 12 can store and maintain the recommendation locally in database 20 until a secondary session is available (step 318).

Those skilled in the art will recognize improvements and modifications to the preferred embodiments of the present invention. All such improvements and modifications are considered within the scope of the concepts disclosed herein and the claims that follow.

What is claimed is:

1. A method of obtaining at a central server information about all of a user's media collections owned by a plurality of user devices, comprising the steps of:
   establishing a unique user account for a user;
   receiving a connection establishment request from more than one of the plurality of user devices each having a unique machine identifier;
   establishing a plurality of connections each with one of the more than one of the plurality of user devices;
   receiving or generating a recommendation for media content for the user account;
   identifying one of the plurality of connections with the plurality of user devices as a primary session;
   filtering the recommendation if content represented by the recommendation is already stored on a user device among the plurality of user devices associated with the user account; and
   for each connected user device of the more than one of the plurality of user devices:
   receiving information about the user's complete media collection owned by the connected user devices; and
   storing the received information about the user's complete media collection according to the unique machine identifier of the connected user device such that the received information is stored under the user account associated with the user.

2. The method of claim 1, further comprising controlling the recommendation from the primary session and downloading content represented by the recommendation to a user device associated with a secondary session comprised of a connection with one of the plurality of user devices different from the connection for the primary session.

3. The method of claim 2, further comprising:
   maintaining the content representing the recommendation for downloading on the central server when the secondary session is not established, and
   downloading the maintained recommendation content to the user device associated with the secondary session when established.

4. The method of claim 2, further comprising downloading the content represented by the recommendation previously downloaded to the user device associated with the secondary session to the user device associated with the primary session.

5. The method of claim 4, wherein the primary session is associated with a wireless device and the secondary session is associated with a computer device.

6. The method of claim 1, further comprising inserting a tag into the recommendation if the recommendation is already on a user device associated with the user account.

7. The method of claim 6, further comprising:
   notifying the user of the tag inserted into the recommendation; and
   providing an adjustment to a score of the recommendation in response to the notification.

8. The method of claim 1, further comprising only allowing downloading of content represented by a received recommendation for media content to the user device associated with the primary session.

9. The method of claim 1, wherein the unique machine identifier is an identifier comprised from the group consisting of: a MAC address, a serial number, and an IP address.

10. The method of claim 1, further comprising receiving or generating a recommendation for media content for the user account.

11. The method of claim 1, further comprising identifying one of the plurality of connections with the plurality of user devices as a primary session.

12. The method of claim 1 further comprising receiving a request for media collection information identifying all of a user's media collections from a previously connected user device.

13. The method of claim 12 further comprising providing the media collection information identifying all of a user's media collections wherein ones of the media collection items are not present on the previously connected user device.

14. The method of claim 13 further comprising downloading to the previously connected user device one or more of the media collection items not present on the previously connected user device.

15. The method of claim 12 further comprising providing the media collection information identifying all of a user's media collections wherein ones of the media items are present on the previously connected user device.

16. The method of claim 1 further comprising receiving a recommendation for media content for the user account.

17. The method of claim 16 further comprising basing the recommendation on the user's media collection stored under the user account.

18. The method of claim 1 wherein the information about a user's media collection comprises a list of all media items residing on a previously connected user device.

19. The method of claim 18 wherein the information about a user's media collection is information other than a playlist.

20. A system for obtaining information about a user's media collections over a network at a central server owned by a plurality of user devices, comprising:
a central server operably connected to the network;
the central server adapted to:
receive a connection establishment request from more than one of the plurality of user devices each having a unique machine identifier;
establish a plurality of connections at the same time each with one of the more than one of the plurality of user devices;
identify one of the plurality of connections with the plurality of user devices as a primary session;
receive or generate a recommendation for media content for the user account;
filter the recommendation if content presented by the recommendation is already stored on a user device among the plurality of user devices associated with the user account; and
for each connected user device of the more than one of the plurality of user devices:
receive information about the user's media collection owned by the connected user devices; and
store the received information about the user's media collection according to the unique machine identifier of the connected user device such that the received information is stored under the user account at the central server.

21. The system of claim 20, wherein at least one of the plurality of connections with a corresponding one of the plurality of user devices is a persistent connection.

22. The system of claim 20, wherein the central server is further adapted to identify one of the connections with the plurality of user devices that was last established as the primary session when identifying one of the plurality of connections.

23. The system of claim 20, wherein the central server is further adapted to control the recommendation from the primary session and download content represented by the recommendation to a user device associated with a secondary session comprised of a connection with one of the plurality of the user devices different from the connection for the primary session.

24. The system of claim 20, wherein the central server is further adapted to send content from the user's media collection to the connected user device in response to a received download request for the content.

25. The system of claim 20, wherein the central server is further adapted to send a message to the connected user device that content requested for download by the user is already owned by another user device among the plurality of user devices associated with the user account.

26. The system of claim 20, wherein the recommendation is based on the user's media collection stored under the user account.

27. A method of obtaining at a central server information about all of a user's media collections owned by a plurality of user devices, comprising the steps of:
establishing a unique user account for a user;
receiving a connection establishment request from more than one of the plurality of user devices each having a unique machine identifier;
establishing a plurality of connections each with one of the more than one of the plurality of user devices;
receiving or generating a recommendation for media content for the user account;
identifying one of the plurality of connections with the plurality of user devices as a primary session;
inserting a tag into the recommendation if the recommendation is already on a user device associated with the user account;
notifying the user of the tag inserted into the recommendation;
providing an adjustment to a score of the recommendation in response to the notification; and
for each connected user device of the more than one of the plurality of user devices:
receiving information about the user's complete media collection owned by the connected user devices; and
storing the received information about the user's complete media collection according to the unique machine identifier of the connected user device such that the received information is stored under the user account associated with the user.

28. The method of claim 27, wherein the user's media collection is comprised of media types comprised from the group consisting of: audio, video, songs, movies, television programs, video clips, and presentations.

29. The method of claim 27, further comprising:
receiving a human readable name for one of the plurality of user devices; and
associating the human readable name with one of the plurality of user devices.

30. A system for obtaining information about a user's media collections over a network at a central server owned by a plurality of user devices, comprising:
the central server operably connected to the network;
the central server adapted to:
receive a connection establishment request from more than one of the plurality of user devices each having a unique machine identifier;
establish a plurality of connections at the same time each with one of the more than one of the plurality of user devices;
identify one of the plurality of connections with the plurality of user devices as a primary session;
receive or generate a recommendation for media content for a user account;
insert a tag into the recommendation if the recommendation is already on a user device associated with the user account;
notify the user of the tag inserted into the recommendation; and
provide an adjustment to a score of the recommendation in response to the notification;
for each connected user device of the more than one of the plurality of user devices:
receive information about the user's media collection owned by the connected user devices; and
store the received information about the user's media collection according to the unique machine identifier of the connected user device such that the received information is stored under the user account at the central server.

31. A non-transitory computer readable medium comprising software to obtain at a central server information about all of a user's media collections owned by a plurality of user devices, the software comprising instructions to:
- establish a unique user account for a user;
- receive a connection establishment request from more than one of the plurality of user devices each having a unique machine identifier;
- establish a plurality of connections each with one of the more than one of the plurality of user devices;
- receive or generating a recommendation for media content for the user account;
- identify one of the plurality of connections with the plurality of user devices as a primary session;
- insert a tag into the recommendation if the recommendation is already on a user device associated with the user account;
- notify the user of the tag inserted into the recommendation;
- provide an adjustment to a score of the recommendation in response to the notification; and
- for each connected user device of the more than one of the plurality of user devices:
  - receive information about the user's complete media collection owned by the connected user devices; and
  - store the received information about the user's complete media collection according to the unique machine identifier of the connected user device such that the received information is stored under the user account associated with the user.

32. A non-transitory computer readable medium comprising software to obtain at a central server information about all of a user's media collections owned by a plurality of user devices, the software comprising instructions to:
- establish a unique user account for a user;
- receive a connection establishment request from more than one of the plurality of user devices each having a unique machine identifier;
- establish a plurality of connections each with one of the more than one of the plurality of user devices;
- receive or generating a recommendation for media content for the user account;
- identify one of the plurality of connections with the plurality of user devices as a primary session;
- filter the recommendation if content represented by the recommendation is already stored on a user device among the plurality of user devices associated with the user account; and
- for each connected user device of the more than one of the plurality of user devices:
  - receive information about the user's complete media collection owned by the connected user devices; and
  - store the received information about the user's complete media collection according to the unique machine identifier of the connected user device such that the received information is stored under the user account associated with the user.

* * * * *